Patented July 13, 1926.

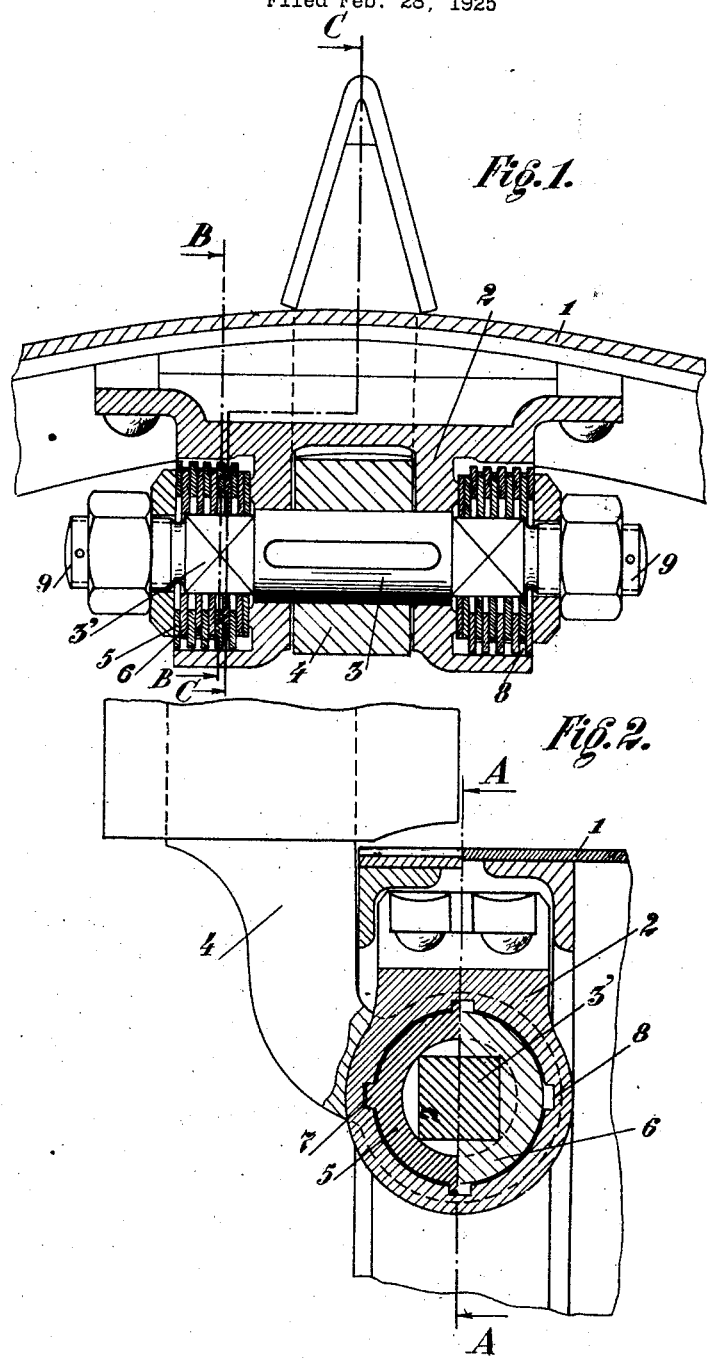

1,592,774

UNITED STATES PATENT OFFICE.

JOSEF LINKE, OF BRESLAU, GERMANY, ASSIGNOR TO THE FIRM J. KEMNA MASCHINEN-FABRIK UND EISENGIESSEREI, OF BRESLAU, GERMANY.

PIVOTABLE SPUR FOR DRIVING WHEELS OF MOTOR PLOWS AND SIMILAR MACHINES.

Application filed February 28, 1925, Serial No. 12,437, and in Germany May 19, 1924.

This invention relates to a pivotal spur adapted to be rigidly fixed on its support on a driving wheel for motor plows or similar machines. Heretofore couplings commonly used for spurs of this type permitted the spur to be fixed only in a position of rest or in working position. The coupling arrangement according to the present invention differs from the commonly employed arrangements in that it has the form of a friction coupling by means of which the spur can be fixed in its support in all positions which it may assume by its pivotal movement. The depth which the spur penetrates into the ground can thus be regulated in accordance to the state of the ground, the coupling and uncoupling of the spur being executed very easily and rapidly, even when the driving wheel is moving at slow speed.

An embodiment of the invention is shown, by way of example, on the accompanying drawings, in which:—

Fig. 1 shows in a section taken perpendicularly to the hub of the wheel a laminæ-clutch as friction coupling.

Fig. 2 shows at the left a section on line B—B and at the right a section on line C—C of Fig. 1.

The felloe 1 of the wheel carries on its inner surface a bracket 2 in which the pivot axle 3 of the basculating spur 4 is keyed. The pivot 3 has two spaced portions 3' which are rectangular in cross section. The rectangular portions 3' have mounted on them two sets of laminæ, each set being composed of alternating laminæ 5 and 6 of different constructions. The laminæ 5 have a circular central aperture which encloses with certain play the square part 3' of the pivot axle and which have noses 7 projecting from their circumference and designed to engage with longitudinal grooves 8 of the bore of the bracket; these laminæ are consequently prevented from rotating but are capable of sliding in axial direction upon the part 3' of the pivot axle which can rotate in these laminæ. The laminæ 6 have, on the contrary, a square aperture corresponding to the shape of the part 3' of the pivot axle so that they must participate in the rotation of the pivot axle and are also capable of moving on the same in axial direction. The ends 9 of the pivot axle 3 are threaded and carry each a nut. By rotating these nuts slightly in the one or other direction the laminæ 5 and 6 are strongly pressed against one another to immobilize the spur in the desired adjusted position or to release the same to readjust its position.

I claim:—

A pivotal spur for driving wheels of motor plows and similar machines adapted to be rigidly clutched on its support comprising in combination with the driving wheel of a motor driven vehicle, a bracket on the inner surface of the wheel rim, said bracket having a transverse opening, a pivot axle journalled in said bracket and having threaded ends, a spur keyed on said pivot axle, the latter being provided with spaced portions of rectangular cross section, two sets of laminæ, one set having a square central aperture and the other having a circular central aperture of greater diameter than the rectangular portions of the pivot axle and the said laminæ being alternately arranged on said rectangular portions of the pivot axle and nuts screwed on the said threaded ends of the pivot axle for securely locking said spur in any adjusted position.

In testimony whereof I affix my signature.

JOSEF LINKE.